(12) United States Patent
Ma et al.

(10) Patent No.: US 9,450,416 B2
(45) Date of Patent: Sep. 20, 2016

(54) WIND TURBINE GENERATOR CONTROLLER RESPONSIVE TO GRID FREQUENCY CHANGE

(71) Applicant: Siemens Aktiengesellschaft, Munich (DE)

(72) Inventors: Hongtao Ma, Orlando, FL (US); Robert J. Nelson, Orlando, FL (US); Najlae M. Yazghi, Orlando, FL (US); William F. Clark, Oviedo, FL (US)

(73) Assignee: Siemens Aktiengesellschaft, München (DE)

( * ) Notice: Subject to any disclaimer, the term of this patent is extended or adjusted under 35 U.S.C. 154(b) by 600 days.

(21) Appl. No.: 13/942,972

(22) Filed: Jul. 16, 2013

(65) Prior Publication Data

US 2015/0022007 A1    Jan. 22, 2015

(51) Int. Cl.
*H02J 3/24* (2006.01)
*H02J 3/38* (2006.01)

(52) U.S. Cl.
CPC ............ *H02J 3/386* (2013.01); *H02J 3/24* (2013.01); *Y02E 10/763* (2013.01); *Y10T 307/718* (2015.04)

(58) Field of Classification Search
CPC .......... H02J 3/386; H02J 3/24; Y02E 10/763
See application file for complete search history.

(56) References Cited

U.S. PATENT DOCUMENTS

| | | | | |
|---|---|---|---|---|
| 8,299,650 B2* | 10/2012 | Yasugi | ............ | F03D 7/0284 307/103 |
| 8,373,291 B2* | 2/2013 | Zeumer | ............ | H02J 3/386 290/44 |
| 8,378,643 B2* | 2/2013 | Arinaga | ............ | F03D 7/0276 290/44 |
| 8,803,350 B2* | 8/2014 | Nielsen | ............ | H02J 3/386 290/44 |
| 2010/0286835 A1* | 11/2010 | Nyborg | ............ | F03D 7/0224 700/287 |
| 2011/0001318 A1* | 1/2011 | Nelson | ............ | F03D 7/0272 290/44 |
| 2011/0012352 A1* | 1/2011 | Nelson | ............ | F03D 7/0272 290/44 |
| 2011/0109086 A1* | 5/2011 | Stiesdal | ............ | F03D 7/0284 290/44 |
| 2013/0027994 A1* | 1/2013 | Nelson | ............ | H02P 9/105 363/40 |
| 2015/0249338 A1* | 9/2015 | Nelson | ............ | H02J 3/1885 307/84 |

FOREIGN PATENT DOCUMENTS

EP    2532888 A1    12/2012

OTHER PUBLICATIONS

Miller et al., "Frequency Responsive wind Plant control: impacts on grid performance," Jul. 24-29, 2011, IEEE Power and Energy society General Metting,pp. 1-8.*

(Continued)

*Primary Examiner* — Thienvu Tran
*Assistant Examiner* — Pinping Sun

(57) ABSTRACT

A wind turbine generator park (1) for supplying power to a power system (37), the park having an assigned first droop response characteristic for use in responding to an under-frequency occurrence on the power system (37). The park comprises a first comparator (108) for generating a first signal when the park is operating according to a curtailed condition, a second comparator (100) for indicating that a change in a frequency of a voltage or current on the power system (37) is greater than a first threshold value, and a controller (114) responsive to the first and second signals for controlling the park according to a second response characteristic causing the park (1) to supply an amount of power to the power system (37) greater than the power supplied according to the first droop response characteristic.

19 Claims, 2 Drawing Sheets

(56) References Cited

OTHER PUBLICATIONS

Muljadi et al. "Understanding inerial and frequency response of wind power plants", IEEE power electronics and Machines in Wind Application, Jul. 16-18, 2012, pp. 1-8.*

Understanding Inertial and Frequency Response of Wind Power Plants; IEEE Symposium on Power Electronics and Machines in Wind Applications, Jul. 16-18, 2012, Conference Paper NREL/CP-5500-55335; by Muljadi, Gevorgian, Singh and Santoso.

* cited by examiner

WIND TURBINE GENERATOR CONTROLLER RESPONSIVE TO GRID FREQUENCY CHANGE

FIELD OF THE INVENTION

The invention relates to the use of wind turbines or wind turbine parks for controlling a power system frequency.

BACKGROUND OF THE INVENTION

As is commonly known, electricity generation and demand must be kept in balance at to maintain system reliability and power quality. When the electric demand drops, it is necessary to throttle back some generators and/or take certain generators off line. When the demand increases, additional generator capacity must be brought on-line or the output of on-line generators increased.

Power system frequency stability is desired and is a function of a balance between generation and consumption. If there is too much generation, residual power is transformed into generator shaft kinetic energy and the line frequency increases. If there is inadequate generation relative to the amount of power consumed, generators take shaft kinetic energy and convert it to electric power, reducing the system frequency. Power system operators try to maintain a constant frequency by matching generation to load.

In a typical power system certain generators are considered frequency-responsive or frequency support generators and other generators are not able to provide frequency stabilization. Examples of the latter may include generators coupled to nuclear generating stations, base load coal plants, and peaking units. Nuclear units and base load coal plants respond too slowly to an event that creates an under frequency or an over frequency condition. Thus these units are usually exempt from participating frequency control.

Generating units reserved for duty during peak power demands are normally brought to full-load generating capacity immediately upon start-up and thus are already in service during capacity shortages. These units may or may not have control algorithms associated with frequency response. However, since they are operated at maximum load they generally cannot respond to under-frequency events. Also, when peaking units are brought on line, the power system must have sufficient online capacity to respond to over-frequency events. Thus peaking units seldom participate in frequency control.

Synchronous generators respond to grid frequency changes according to either an inertial response or a governor response (i.e., a droop response).

Synchronous generators driven by a steam or gas turbine have an inherent inertial response as a consequence of the physical characteristics of the rotating turbine mass. This inertial response is initiated by an incident such as a change in the electrical torque caused by grid frequency changes. This inertial response is fast, inherent, uncontrolled and transient. Duration of a typical inertial response is about 5 to 20 seconds. After the inertial response ends, the generator output returns to its pre-incident condition because of the energy extracted during the response period.

Synchronous generators are also controlled to a new operating condition according to a governor response during which the amount of mechanical power supplied to the generator is controlled (increased or decreased) by altering the fuel flow to a gas turbine or the steam flow to a steam turbine. The fuel flow or steam flow remains at this new level until the next governor response to another incident.

There are conventionally two governor response modes, the droop mode and the isochronous mode, to match generation to load demand and thereby maintain a grid frequency of 60.00 Hz in North America. If neither of these control schemes are sufficient to maintain that balance, generating units can be manually brought on-line or taken off-line as needed.

Generating units that follow load and are therefore designated as frequency-responsive generators, (these units typically include, for example, combined cycle generators and non-base-load steam generators) are controlled according to a speed droop setting. A typical droop setting in the United States is 4% or 5%. Droop-mode generators are controlled to decrease their power output if the frequency goes above a predetermined dead band, which is typically either +0.0166 or +0.036 Hz from a nominal frequency (60 Hz in North America). These generators are also controlled to increase their power output (if they have sufficient generation headroom) when the frequency drops below a dead band, e.g., 0.0166 or 0.036 Hz below the nominal frequency of 60 Hz or 50 Hz.

All droop mode turbine controllers on the power system work in concert to share load demand changes among all operating turbines-generators. The load demand change is shared in proportion to a ratio of the base load rating of each generator to the overall grid generating capacity. A typical droop characteristic for a generator is 5%. If the frequency changes by 5% or more, there will be a 100% change in generator output.

In practice, most frequency variations are considerably less than this 5% value. A large frequency excursion is generally considered on the order of 0.25% or 0.15 Hz for a 60 Hz grid frequency. Any frequency deviation larger than this is considered an emergency condition that initiates an under-frequency load shedding incident.

If a unit operates according to a 5% droop, in response to a 5% frequency change the unit responds with a 100% change in output (based on the nameplate rating of the generator). A 1% frequency change corresponds to a 20% change in output power; a 2% frequency change corresponds to 40% change in output power, etc.

For example if a unit rated at 100 MW is operating at an output power of 50 MW and the frequency suddenly drops to 59.4 Hz (a 1% reduction), the turbine controller detects this change and the generator is expected to increase its output by 20 MW (20% of its rated output) to 70 MW. The output is controlled to increase in a very short period of time. Time requirements vary but a typical requirement is one minute or less.

If the frequency rises to 61.2 Hz (a 2% increase), the unit is expected to reduce its output by 40 MW (40% of 100 MW) to 10 MW or to its minimum load, whichever is greater.

As those skilled in the art are aware, there are a few nuances in the application of these rules. For example, instead of an absolute threshold value for increasing or decreasing generator output, a dead-band frequency range can be implemented. If the frequency change is within this dead band range the generator output does not change. System operators may utilize a relatively wide or a relatively narrow dead-band width or dead-band range. Further, the frequency deviation may be measured from an edge of a dead band or from a center of the dead-band.

The actual system frequency threshold or dead band range (and the other variables set forth in the immediately preceding paragraph) that cause the frequency responsive reserves to be activated are determined by the independent system operator.

This threshold may be greater than 59.5 Hz, since there are some older operating turbines that have under-speed trip points at 3570 rpm, which corresponds to 59.5 Hz. Thus the 59.5 Hz value is significantly below the dead band imposed by system operators. In North America the dead band threshold is typically either 59.983 Hz or 58.964 Hz. When the line frequency drops below this value the frequency-responsive generators increase their output as explained above.

The formula for determining the increase or decrease of a generator's output (A MW) is:

$$\Delta MW = (fo - freq) \times Pnom / (fo \times pu\ droop)$$

Where, $\Delta MW$ is the desired change in MW output,
fo is the nominal system or line frequency (60 Hz in North America),
freq is the actual frequency measured,
Pnom is the nominal output of the generator, and
pu droop is the percent droop rating divided by 100.
For the second example set forth above,
fo=60
freq=61.2
Pnom=100
pu droop=0.05 and therefore
and therefore, $$\Delta MW = (60 - 61.2) \times 100 / (60 \times 0.05)$$

$$\Delta MW = -40$$

Calculations such as those set forth above that estimate a desired change in system output may be inaccurate because real turbines and generators have operating limits that are not explicitly considered in the governing equation. For example, a unit that is already generating its maximum or minimum load (i.e., its nameplate capacity) cannot respond, respectively, to an under-frequency or an over-frequency event.

Often the operating limits of a turbine or generator are dictated by pollution emissions, which can vary from site to site and even from season to season.

For example, if the system load or system demand is 10,000 MW and an incident occurs that causes a 1% frequency drop (thus requiring a 20% increase in system output), there may not be an output change of 2000 MW. Although there may be 12000 MW on-line and therefore the output can theoretically increase to 12000 MW, a substantial portion of the 12000 MW may not be able to fully respond to the demand increase either because turbines are already operating at their capacity limit or because the turbines are not equipped for frequency response operation. Thus the actual system response may be much smaller than as calculated according to the formula above.

Very large under-frequency deviations usually invoke an automatic under-frequency load shedding event to prevent generators from tripping off line. Generators typically trip when subjected to large frequency excursions for an extended period (which, in some cases, may be more than only a few seconds). These load shedding events are typically mass customer disconnections. In some cases entire towns may be disconnected.

Over-frequency incidents are usually much easier to solve by simply reducing system generation.

When electric demand drops significantly, for example during the overnight hours, the droop and isochronous control schemes may not be sufficient to balance the generation and load. Instead, it may be necessary to throttle back some generators and/or take certain generators off line. But it is desired, if not required in some circumstances, that certain generators must be kept operating at a minimum level, e.g., base load generators especially including base load generators coupled to nuclear generating stations. Thus the power system operator may "curtail" certain generators (i.e., reducing generation supplied to the grid below 100% of the power available (where power available is determined by present wind conditions), even to 0% power output) or taking the generating unit off-line during such periods.

Combustion generators (whether using oil, diesel or bio-fuel as the fuel source) can be throttled back to a certain degree. Peak generating units are turned off when the peak demand, usually from about 5 to 9 PM on weekdays, is over. Cycling generating units are also turned down or off as demand drops in the late evening. Base-loaded generating units, usually the largest, steam turbine units on the grid, are only infrequently turned down and then only to their minimum required generation level.

If more energy reductions are needed to balance generation and load, most transmission system operators curtail wind turbine generators (and wind turbine parks comprising several wind turbine generators proximately situated in a geographic region) to less than 100% of available output. In a curtailed operating mode the wind turbine generator or the wind turbine park is operating at less than the total power available from current wind conditions. Thus such curtailments occur even when the wind is blowing and additional energy can be extracted from the wind (i.e., additional generation is available). Transmission system operators prefer to curtail the wind turbine generators (WTGs) during these off-peak periods in lieu of curtailing a base load unit or taking it off line. The ability of a transmission system operator to curtail WTGs makes these units more challenging to operate efficiently and profitably.

There are two forms of WTGs: fixed speed WTGs and variable speed WTGs.

In a fixed-speed WTG wind-driven blades drive a blade rotor that in turn operates through a gear box (i.e., a transmission) to turn a gearbox output shaft at a fixed speed. The gearbox output shaft is connected to an induction (asynchronous) generator for generating real power.

In the induction generator the rotor and its associated conductors rotate faster than the rotating flux applied to the stator from the grid (i.e., higher than the synchronous field frequency). The difference in these two values is referred to as "slip." At this higher speed, the direction of the induced rotor current is reversed, in turn reversing the counter EMF (electromotive force) generated in the rotor windings, and by generator action (induction) causing current (and real power) to be generated in and flow from the stator windings. The frequency of the voltage generated in the stator is the same as the frequency of the voltage applied to the stator to develop the stator excitation.

The fixed-speed wind turbine is simple, reliable, low-cost and proven. But its disadvantages include uncontrollable reactive power consumption (as required to generate the stator rotating flux), mechanical stresses, limited control of power quality and relatively inefficient operation. In fact, wind speed fluctuations result in mechanical torque fluctuations that can result in fluctuations in the electrical power on the grid.

Variable speed WTG operation can be achieved only by decoupling the electrical grid frequency and the mechanical rotor frequency. The rotational blade speed of a variable speed WTG can be controlled to continuously adapt to the wind speed and maximize the power generated by the wind turbine. Since an electric generator is usually coupled to a variable speed WTG rotor through a fixed-ratio gear transmission, the electrical power produced by the generator has a variable frequency.

An electronic power converter is interposed between the generator output and a power system or grid to which the WTG supplies power. Generally, the power converter imparts characteristics to the generated electricity that match the electricity flowing on the grid, including controllable active power flow, voltage magnitude and frequency. Thus the converter converts the variable electrical frequency voltage output from the generator stator to the grid frequency and voltage. The power converter also electrically and mechanically decouples the grid from the WTG.

Although variable-speed WTGs are advantageous from the perspective of increased energy conversion and reduced mechanical stresses, the electrical generation system is more complicated than that of a constant speed wind turbine due primarily to the need for a power converter.

Both fixed speed and variable speed WTGs are designed to operate in parallel with a synchronous generator, both supplying power to the grid. The WTG's synchronize to the grid frequency to produce a constant frequency electrical output.

FIG. 1 illustrates a prior art wind turbine generator park 1 comprising variable speed wind turbine generators 2, 3.

The WTGs 2, 3 generate electrical power that is supplied to a utility grid or power system 37. Preferably, the WTGs 2, 3 are variable speed wind turbines, i.e., the rotational speed of their respective generator rotors is variable depending on wind conditions.

Each WTG 2, 3 comprises turbine blades 4, 5 attached to a rotor shaft 6, 7 for transmitting the torque of the wind-driven blades 4, 5 to a gearbox 8, 9. An output shaft of the gearbox 8, 9 drives an AC generator 17, 19 for transforming the mechanical power provided by rotation of the rotor shaft 6, 7 to electrical power. The gearbox 8, 9 provides a transmission ratio that allows the gearbox output shaft to turn at a different speed than the rotor shaft 6, 7. Preferably the gearbox output shaft turns at a speed that optimizes the electricity generated by the AC generators 17, 19.

The AC generator 17, 19 can comprise either a synchronous generator or an asynchronous (induction) generator and further each comprises power electronics components. Generally, in a synchronous generator, a generator rotor rotates at the same rotational frequency as the rotating magnetic field produced by a generator stator (or with an integer relationship to the frequency of the rotating magnetic field, where that integer relationship depends on the number of rotor pole pairs).

In contrast thereto, in an asynchronous generator (induction generator) the rotational frequency of the stator's magnetic field (conventionally 60 Hz when the stator magnetizing current is supplied from the electrical grid) is independent from the rotational frequency of the rotor. The difference in rotational frequency of the rotor and the stator is numerically described by a slip value.

If the generators 17, 19 of FIG. 1 comprise synchronous generators, the frequency of the output power therefrom depends on wind velocity. But that output frequency must be converted to the frequency of the power system 37 to which the generators 17, 19 supply electricity.

The frequency conversion process is accomplished by action of power electronics frequency converters 21, 23. Each frequency converter converts the frequency of the electrical power delivered by generators 17, 19 into an electrical power having a fixed frequency corresponding to the frequency of the power system 37. Each frequency converter 21, 23 comprise a respective generator-side converter (rectifier) 25, 27 for converting the AC current produced by the generator 17, 19 into a DC current. A network-side converter (an inverter) 29, 31 converts the DC current back to an AC current at the frequency of the power system 37. The AC output of the network-side converter 29, 31 is supplied to the power system 37 from the node 35 through a transformer 33.

BRIEF DESCRIPTION OF THE DRAWINGS

The invention is explained in the following description in view of the drawings that show.

DETAILED DESCRIPTION OF THE INVENTION

Figure 1:
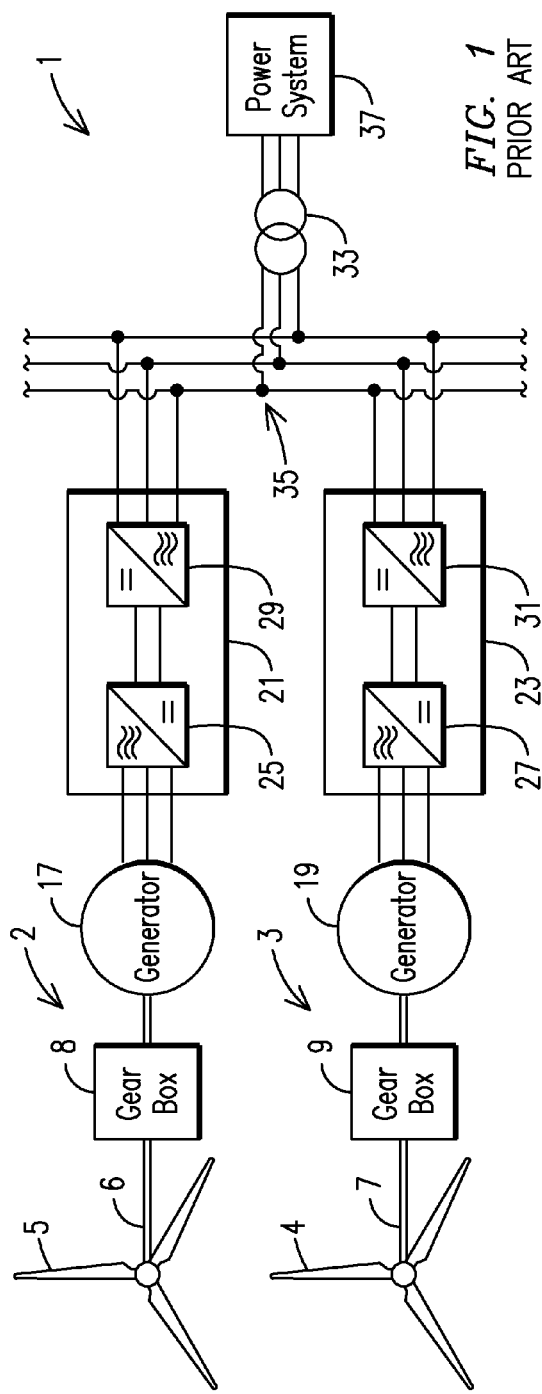
FIG. 1 is a prior art wind turbine generator park.

According to the prior art, on-line wind turbine parks can be designated to participate in grid frequency droop control and are thereby controlled to adjust their power output in real time in response to grid frequency changes according to their assigned droop characteristic.

When the system frequency increases above a given dead band or threshold, the WTGs in the park are controlled to reduce their power output according to an assigned droop-type governor control characteristic.

Similarly, when the grid frequency drops below a given dead band or threshold, the WTGs can increase their power output, again according to their assigned droop characteristic provided, of course, that the WTGs power output is below the total power available to be extracted from current wind conditions.

According to one embodiment of the present invention, when a wind turbine park is operating in a curtailed mode (i.e., operating a WTG or a WTG park at less than the total power available from current wind conditions) and an under-frequency condition is detected and that condition exceeds a predetermined threshold or dead band, the wind turbine park is brought to a full or 100% of available output power. This full or 100% output power condition obviously exceeds any droop condition assigned to the park according to the prior art. According to this invention the full output power of the wind turbine park assists in relieving the under-frequency condition and the park can be brought to available full power output (as that "available full power" output is determined by current wind conditions) in one or two minutes, which is considerably faster than prior art modes of under-frequency control.

According to another embodiment, in lieu of bringing the wind park to 100% output power, a different value can be selected as determined by market or other factors. But in any case this "different value" is in excess of the droop characteristic assigned to the wind park.

According to yet another embodiment, the wind park output power can be increased in discrete steps, with each step associated with a certain under-frequency value. Generally, greater under-frequency values (e.g. a frequency that is 0.5% below its nominal value) result in greater increases in power output than smaller under frequency values (e.g., a frequency that is 0.1% below its nominal value). This scheme differs from a conventional droop characteristic in that the latter is a smooth or linear function, while discrete power output steps are invoked according to the present invention.

According to another embodiment, the wind park output can be increased according to an linear or non-linear trajectory (e.g., exponential) bringing the wind park output to 100% of available power or to a value less than 100%. The trajectory can also extend over any time interval and at any ramp rate the wind turbine generator park can accommodate.

The various WTG response scenarios set forth above are referred to as under-frequency response characteristics assigned to the WTG when an under frequency incident is detected. Such an under frequency response characteristic can involve the WTG supplying more power to the power system than according to a conventional droop characteristic and/or supplying the additional power at a faster rate. As described above, since the WTG is operating in a curtailed mode it can respond faster to such under frequency events than other frequency-responsive generators.

Wind parks are sometimes curtailed and in certain jurisdictions they are required to provide frequency support while in a curtailed condition. However, according to the prior art that frequency support is provided according to a droop characteristic (typically 5% as described above) assigned to the wind park. This prior art control scheme fails to use most of the available wind power. In regions that regularly experience wind speeds suitable for generating electrical power, this scheme results in an under-utilization of wind power.

According to the present invention, it is desired to operate WTGs to provide frequency-responsive reserves (i.e., to control the system frequency) beyond their assigned droop characteristics.

ERCOT (Electric Reliability Council of Texas, an ISO or power system operator) defines a generating unit that can provide frequency-responsive reserves as one that:

A. Can arrest frequency decay within the first few seconds of a significant frequency deviation using primary frequency response and interruptible loads.

B. After the first few seconds of a significant frequency deviation, can help restore the system frequency to its scheduled value, returning the power system to normal operation.

C. Can provide energy or continued load interruption during implementation of the EEA and D. Can provide back-up frequency regulation.

Other independent system operators have similar definitions for operating their transmission system.

Typically, frequency-responsive generating reserves are expected to provide power to the grid as quickly as possible to avoid under-frequency load tripping.

But a curtailed WTG can be controlled from zero output to full output power (as taught by the present invention) in a few seconds, e.g., about 10 seconds. Unfortunately, in the prior art the wind turbine parks are either not expected to respond to frequency deviation events (because they are not considered "firm" power because when needed in response to an under-frequency event sufficient wind energy may not be available) or they are controlled to respond to such events only on a droop characteristic (e.g., 5%) as described above.

Those skilled in the art have failed to recognize that power system frequency drops are typically significantly below the typical droop characteristic of 5%. According to the prior art, a 5% frequency drop causes the WTG to provide its full power output to the power system. And in the prior art a frequency drop of less than 5% causes the WTG to provide only a proportional share of its full output power to the grid to prop up the frequency.

For example, according to the prior art, a frequency drop of 0.5% causes a wind turbine park operating according to a 5% droop characteristic to come on-line and supply 10% of its rated capability. This 10% value is determined from the ratios:

$$5\%/100\% = 0.5\%/X$$

$$X = 10\%$$

If the frequency drops 0.25% (to 59.85 Hz) for a 5% droop characteristic then:

$$5\%/100\% = 0.25\%/X$$

$$X = 5\%$$

Thus a 100 MW WTG park, according to the prior art, is controlled to increase its output power to 5% of 100 MW or 5 MW. The WTG operator is expected to provide the additional 5 MW of power at no charge if sufficient wind energy is available.

According to the present invention, the WTGs are not operated according to the droop characteristic (or the WTGs implement the control scheme of the present invention in addition to the conventional droop control characteristic). If a WTG or wind turbine park is operating in a curtailed mode and an under-frequency condition occurs, in one embodiment the wind park or the WTGs are controlled to provide 100% of the available power (as determined by the then-current wind conditions) to the power system as quickly as possible.

Figure 2:
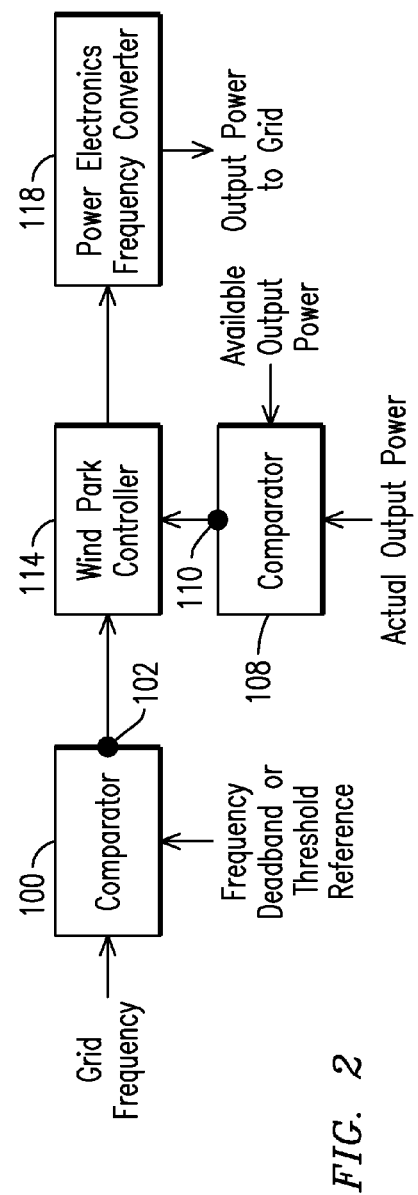
FIG. 2 is a block diagram illustrating the control components of the present invention.

With reference to FIG. 2 according to the present invention, a wind turbine park comparator 100 is responsive to a signal representing the actual grid frequency and reference signal, e.g., a predetermined frequency threshold or a dead band. The comparator 100 detects an under-frequency condition beyond the reference or outside the dead band and supplies a representative signal at a terminal 102.

A comparator 108 is responsive to a signal representing the actual output power from the wind turbine park and to a signal representing the output power capacity of the park based on current wind conditions. Thus a signal at a terminal 110 of the comparator 108 indicates whether the park is operating in a curtailed condition, i.e., actual output power less than available output power capacity.

The signals at the terminals 102 and 110 are input to a wind park controller 114 to control a power electronics frequency converter 118 to bring the wind park up to full output power as quickly as possible when operating from a curtailed condition. This action relieves the under-frequency condition very quickly while utilizing the maximum power generating resources of the wind park.

The wind park remains in the full-power mode (a steady state condition) for an unlimited duration, until the next under-frequency or over-frequency incident occurs or as controlled by the system operator. The park does not automatically return to a pre-incident output power level.

While other power generating resources (photovoltaic and hydroelectric) can also employ such a control scheme, the WTGs can respond to control signals increasing (or decreasing) their output faster than these other power generating devices.

If the grid frequency stabilizes at 60.00 Hz responsive to the control action of the wind turbine park, it should be unnecessary for other power generating devices to also respond to the under-frequency condition. In practice, because the WTGs can emerge from their curtailed condition quickly, the power generated by the wind turbine park may relieve the under-frequency condition before any other power generating resources have had sufficient time to initiate control actions to relieve the under frequency condition.

Typically, in certain wind-rich regions the wind-generated power made available according to the teachings of the present invention is available during both on and off-peak periods. If a nuclear plant or a large base load coal plant trips in a system like ERCOT (Texas) or a Canadian province the grid frequency can plummet. Frequency responsive WTG reserves controlled according to the teachings of the present invention can be quickly brought on line at full power to maintain a stable grid frequency.

Since WTG curtailments may, and frequently are, concurrent with conditions of available wind power. Operation of the WTGs or wind park according to the prior art control schemes wastes available wind power as the WTGs are not contributing their full available output capacity to the power system. Additionally, from a business perspective, a wind park owner can be compensated for a frequency responsive reserve of the wind turbine park.

According to another embodiment, the invention teaches two or more different frequency threshold or dead bands. A first is operative when the wind turbine park is in a curtailed state as described herein. The second is operative when the wind turbine park is operating at 100% capacity but additional energy can be extracted from the wind (i.e., additional energy headroom is available).

The invention also provides a profit-making opportunity for a WTG wind park for the park owner. It is possible to sell frequency responsive reserves so that if the frequency extends outside of the dead band or threshold, the entire 100% WTG capacity can be provided. Such frequency reserves are typically sold for about $20/MWH. The frequency responsive reserves for a 100 MW WTG park would cost about $2000 an hour.

Presently, this arrangement is not permitted in most jurisdictions because wind power is not considered "firm" power. It is also not considered reserve capacity for the power system. Instead, the wind energy is considered just "energy." On a cumulative or annual basis that conclusion might be true, but it is not true at any given point in time. Thus again there is ample support for implementing the teachings of the present invention in a power system that includes one or more wind turbine parks.

According to another embodiment, WTGs or a wind turbine park can also be employed to detect over-frequency conditions. During these conditions the WTGs that are on-line can quickly drop their output power. Wind turbine plants can respond very fast to abnormal frequency incidents, e.g., an order of magnitude faster than other generating units. For example, a WTG can respond at a rate of about 10% per second (increase or decrease) vs. 10% per minute for a fast gas turbine and a few percent per hour for a base load steam plant.

Figure 3:
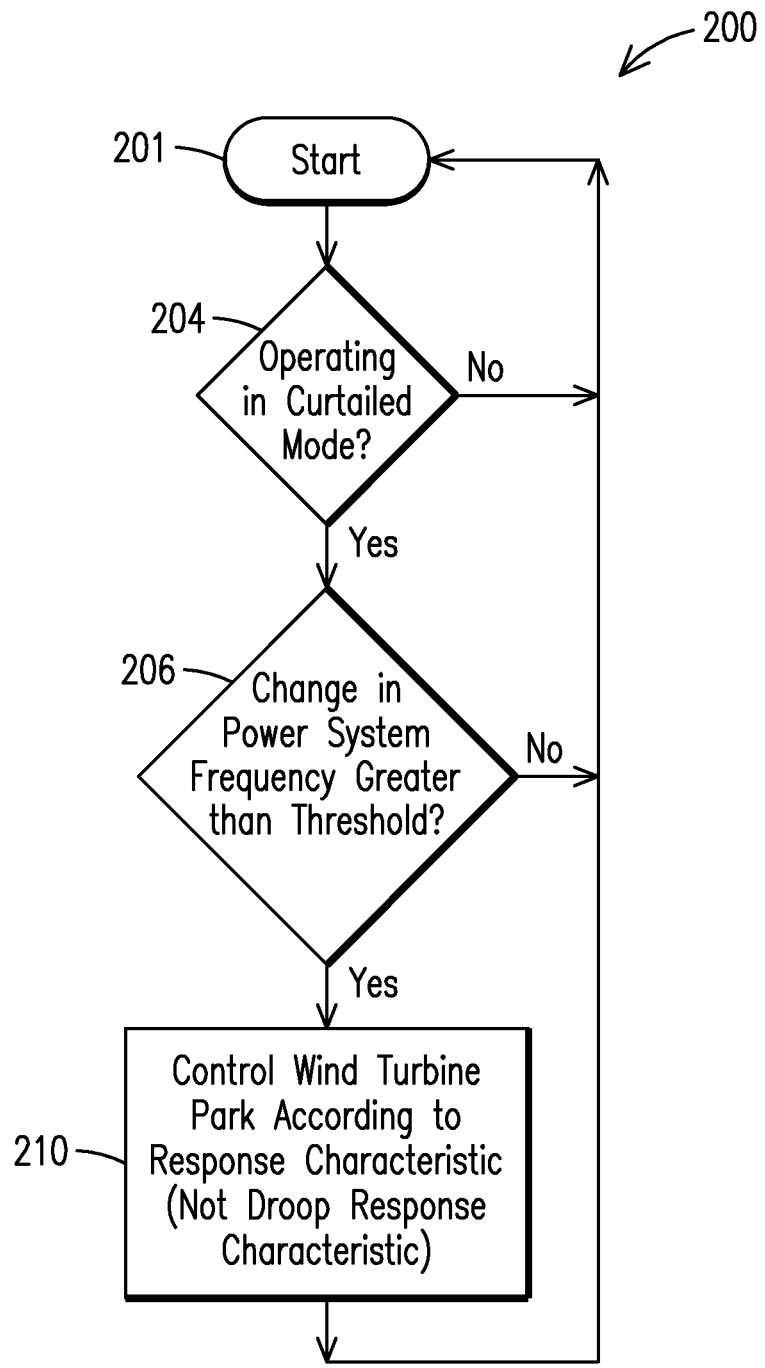
FIG. 3 is a flow chart depicting the method steps associated with the present invention.

FIG. 3 depicts a flow chart 200 setting forth certain principle steps associated with the present invention. Execution begins at a step 201 and proceeds to a decision step 204 for determining whether the WTG or the WTG park is operating in a curtailed mode. A negative response returns processing to the start step 201. An affirmative answer at the decision step 204 directs processing to a decision step 206 where it is determined whether the change in the power system frequency is greater than a predetermined threshold.

A negative response returns processing to the start step 201. An affirmative answer controls processing to a step 210 where the WTG or the WTG park is controlled according to a response characteristic that is different from the known droop response characteristic. From the step 210 processing returns to the start step 201 and continues cycling through the identified steps for controlling the WTG or the WTG park.

Although the present invention has been described in the context of wind turbine generators, its teachings are also applicable to solar or photovoltaic generators or any other electricity generating devices that supply frequency responsive reserves.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A wind turbine generator park for supplying power to a power system, the park having an assigned first droop response characteristic, the park comprising:
   a first comparator for producing a first signal when the park is operating according to a curtailed condition;
   a second comparator for determining whether drop in a frequency of a voltage or current on the power system is greater than a first threshold value;
   a controller responsive to the first signal for controlling the park according to a first droop response characteristic supplying power at a first rate when the drop in frequency of the voltage or current on the power system is not greater than the first threshold value; and
   the controller responsive to the first signal for controlling the park according to a second response characteristic if the drop in frequency of the voltage or current on the power system is greater than the first threshold value, the second response characteristic causing the park to supply an amount of power to the power system greater than power supplied according to the first droop response characteristic and at a second rate faster than the first rate, wherein according to the second response characteristic the park can supply 100% of available power to the power system.

2. The wind turbine generator park of claim 1 wherein the first threshold value comprises a power system reference frequency.

3. The wind turbine generator park of claim 2 wherein the power system reference frequency comprises a power system reference frequency dead band such that if the drop in frequency of a voltage or current on the power system is within the reference frequency dead band the second comparator determines that the drop in frequency of voltage or current on the power system is not greater than the first threshold value.

4. The wind turbine generator park of claim 1 wherein if according to the second response characteristic the park supplies 100% of available power to the power system, the park remains in a 100% available power condition until another control condition is imposed.

5. The wind turbine generator park of claim 1 wherein according to the second response characteristic the park supplies the amount of power to the power system at a rate of about 10% of available power per second.

6. The wind turbine generator park of claim 1 wherein according to the second response characteristic the park supplies available power to the power system in discrete steps, each discrete step according to a different threshold value.

7. The wind turbine generator park of claim 1 wherein according to the second response characteristic the park supplies 100% of available power to the power system according a linear or a non-linear trajectory.

8. The wind turbine generator park of claim 1 wherein according to the second response characteristic the park supplies less than 100% of available power to the power system.

9. The wind turbine generator park of claim 1 the controller for controlling the park according to a third response characteristic when the park is not operating according to a curtailed condition, the third response characteristic different from the first droop and second response characteristics.

10. The wind turbine generator park of claim 1 wherein power supplied to the power system by the park according to the second response characteristic does not return to a pre-occurrence value after an under-frequency occurrence.

11. The wind turbine generator park of claim 1, the second comparator for determining whether the drop in a frequency of a voltage or current on the power system is greater than a second threshold value different from the first threshold value;
the controller for controlling the park according to a third response characteristic responsive to the first signal and when the drop in the frequency of a voltage or current on the power system is greater than the second threshold value, the third response characteristic different from the first droop and second response characteristics.

12. A method for controlling a wind turbine generator park for supplying power to a power system, the park having an assigned first droop response characteristic, the method comprising:
producing a first signal when the park is operating according to a curtailed condition;
detecting a change in a frequency of a voltage or current on the power system that is greater than a first threshold value;
responsive to the first signal, controlling the park according to a first droop characteristic supplying power at a first rate when the change in frequency of the voltage or current on the power system is not greater than the first threshold value; and
responsive to the first signal, controlling the park according to a second response characteristic if the change in the voltage or current on the power system is greater than the first threshold value, according to the second response characteristic the park supplying power to the power system greater than power supplied according to the first droop response characteristic and at a second rate faster than the first rate, wherein according to the second response characteristic the park can supply 100% of available power to the power system.

13. The method of claim 12 wherein the first threshold value comprises one of a power system reference frequency and a power system reference frequency dead band such that the step of detecting determines if the change in the frequency of the voltage or current on the power system is outside the reference frequency dead band or greater than the reference frequency.

14. The method of claim 12 wherein supplying power comprises supplying about 100% of available power to the power system.

15. The method of claim 12 wherein supplying power comprises supplying power at a rate of about 10% of available power per second.

16. The method of claim 12 wherein supplying power comprises supplying available power to the power system in discrete steps, each discrete step according to a different threshold value.

17. The method of claim 12 wherein supplying power comprises supplying about 100% of available power to the power system according a linear or a non-linear trajectory.

18. The method of claim 12 wherein supplying power comprises supplying less than about 100% of available power to the power system.

19. The method of claim 12 further comprising detecting a change in a frequency of a voltage or current on the power system that is greater than a second threshold value that is different from the first threshold value, and controlling the park responsive thereto according to a third response characteristic the third response characteristic different from the first droop and second response characteristics.

* * * * *